United States Patent
Rothschild et al.

(10) Patent No.: US 11,664,988 B2
(45) Date of Patent: May 30, 2023

(54) METHOD AND SYSTEM FOR ENCRYPTING AND DECRYPTING SECRETS USING ESCROW AGENTS

(71) Applicant: EMC IP Holding Company LLC, Hopkinton, MA (US)

(72) Inventors: Seth Jacob Rothschild, Littleton, MA (US); Radia Joy Perlman, Redmond, WA (US); Alex Robbins, Mansfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 241 days.

(21) Appl. No.: 17/107,786

(22) Filed: Nov. 30, 2020

(65) Prior Publication Data

US 2022/0173903 A1 Jun. 2, 2022

(51) Int. Cl.
*H04L 29/06* (2006.01)
*H04L 9/08* (2006.01)
*H04L 9/06* (2006.01)
*G06F 21/30* (2013.01)
*H04L 9/30* (2006.01)

(52) U.S. Cl.
CPC ............ *H04L 9/0894* (2013.01); *G06F 21/30* (2013.01); *H04L 9/0643* (2013.01); *H04L 9/0869* (2013.01); *H04L 9/3013* (2013.01)

(58) Field of Classification Search
CPC ... H04L 9/0894; H04L 9/0643; H04L 9/0869; H04L 9/3013; G06F 21/30
See application file for complete search history.

(56) References Cited

U.S. PATENT DOCUMENTS

| | | | | |
|---|---|---|---|---|
| 5,633,929 | A | * | 5/1997 | Kaliski, Jr. ........... H04L 9/0894 713/180 |
| 5,937,066 | A | * | 8/1999 | Gennaro ................. H04L 9/085 380/286 |
| 7,660,423 | B2 | | 2/2010 | Perlman |
| 8,538,014 | B2 | | 9/2013 | Perlman |
| 8,635,284 | B1 | | 1/2014 | Tripathi et al. |
| 2011/0093721 | A1 | * | 4/2011 | Perlman ................ G06F 21/602 713/189 |

(Continued)

FOREIGN PATENT DOCUMENTS

CA 2360095 A1 * 11/2000

OTHER PUBLICATIONS

Liu, Jingwei, et al. "Certificateless remote anonymous authentication schemes for wireless body area networks." IEEE Transactions on parallel and distributed systems 25.2 (2013): 332-342. (Year: 2013).*

(Continued)

*Primary Examiner* — Shawnchoy Rahman
(74) *Attorney, Agent, or Firm* — Chamberlain, Hrdlicka, White, Williams & Aughtry (57) ABSTRACT

A method for securing a secret of a client using an escrow agent operatively connected to the client includes initiating enrollment of the client with the escrow agent, wherein the enrollment results the escrow agent generating a key pair comprising a public key and a private key, obtaining the public key from the escrow agent, wherein the private key is not shared with the client, encrypting the secret with the public key to obtain an encrypted secret, and storing the encrypted secret on the client.

18 Claims, 9 Drawing Sheets

(56) References Cited

U.S. PATENT DOCUMENTS

| | | | |
|---|---|---|---|
| 2020/0021438 A1* | 1/2020 | Gasparini | G06F 16/907 |
| 2020/0084032 A1* | 3/2020 | Brickell | G06F 21/71 |
| 2020/0295934 A1* | 9/2020 | Diaz Vico | H04L 9/14 |

OTHER PUBLICATIONS

Schneier, Bruce. "Applied Cryptography," second edition, Chapter 19. 2015. (Year: 2015).*

* cited by examiner

METHOD AND SYSTEM FOR ENCRYPTING AND DECRYPTING SECRETS USING ESCROW AGENTS

BACKGROUND

Computing devices may include any number of internal components such as processors, memory, and persistent storage. Data sent between computing devices may be subject to undesired exposure to additional computing devices. Computing devices may implement security measures in an attempt to reduce the undesired exposure.

SUMMARY

In general, in one aspect, the invention relates to a method for securing a secret of a client using an escrow agent operatively connected to the client. The method includes initiating enrollment of the client with the escrow agent, wherein the enrollment results the escrow agent generating a key pair comprising a public key and a private key, obtaining the public key from the escrow agent, wherein the private key is not shared with the client, encrypting the secret with the public key to obtain an encrypted secret, and storing the encrypted secret on the client.

In general, in one aspect, the invention relates to a method for securing a secret of a client using an escrow agent operatively connected to the client. The method includes initiating enrollment of the client with the escrow agent, wherein the enrollment results the escrow agent and the client establishing a base value (g) and prime modulus value (p), and wherein the escrow agent generates a private number (B_C) that is associated with the client but is not accessible to the client, obtaining a public key from the escrow agent, wherein the public key is derived from g, p, and B_C, generating an encryption key using the public key and a private random number A, wherein A is not accessible to the escrow agent, encrypting the secret using the encryption key to obtain an encrypted secret, and storing the encrypted secret and an additional key in the client, wherein the additional key is a function of p, g, and A.

In general, in one aspect, the invention relates to a non-transitory computer readable medium that includes computer readable program code, which when executed by a computer processor enables the computer processor to perform a method for securing a secret of a client using an escrow agent operatively connected to the client. The method includes initiating enrollment of the client with the escrow agent, wherein the enrollment results the escrow agent generating a key pair comprising a public key and a private key, obtaining the public key from the escrow agent, wherein the private key is not shared with the client, encrypting the secret with the public key to obtain an encrypted secret, and storing the encrypted secret on the client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for encrypting data. The data may be encrypted using a system of escrow agents, a client, and a client storage. The client may store an encrypted version of the data (also referred to as an encrypted secret) generated using a public key provided by one or more of the escrow agents. Further, decrypting the encrypted secret may require the use of the escrow agent(s) that stores a private key inaccessible to the client. In order to prevent the escrow agent(s) from obtaining the secret, a blinding operation may be performed on the encrypted secret prior to providing it to the escrow agent(s). The blinding operation may be undone only by the client device. In this manner, the secret, both decrypted and unblinded, may only be accessed with the use of both the client device and the escrow agents in the system.

The following is a non-limiting example describing one or more embodiments of the invention. Turning to the example, consider a scenario in which a client device sends a secret encryption initiation request to an escrow agent. The secret encryption initiation request specifies initiating an encryption on a secret to be stored in a storage accessible only to the client device. The escrow agent may initiate a generation of a pairing entry that includes a public key and a private key. The escrow agent may respond with the public key. The client device may encrypt the secret using the provided public key and store the encrypted key in the client storage. The public key may not be used to decrypt the encrypted secret. At a later point in time, the client desires to access a decrypted version of the secret. The client device performs a blinding operation using at least a portion of values known only to the client device. The client device then sends a secret decryption request to the escrow agent that includes the blinded, encrypted secret. After verifying the authenticity of the client device using an authorization service, the escrow agent may use the private key to perform the decryption and obtain the decrypted blinded secret. The decrypted blinded secret is returned to the client device. The client device may then perform an unblinding operation to the blinded decrypted secret to obtain the desired unblinded, decrypted secret.

Figure 1:
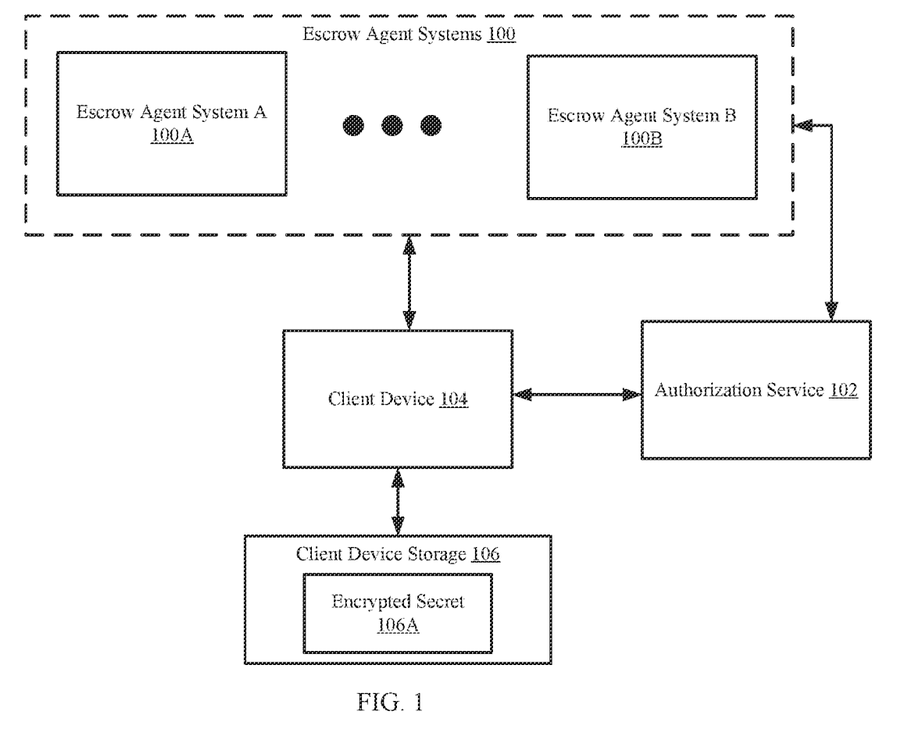
FIG. 1 shows a diagram of a system in accordance with one or more embodiments of the invention.

FIG. 1 shows a diagram of a system in accordance with one or more embodiments of the invention. The system includes an authorization service (102), one or more escrow agent systems (100), a client device (104), and a client device storage (106) accessible only to the client device (104). Each component of the system may be operably connected via any combination of wired and/or wireless connections. Each component of the system illustrated in FIG. 1 is discussed below.

In one or more embodiments of the invention, a secret is sensitive data that is not intended to be accessible to any entity except the corresponding client device (104). The secret may be, for example, a password. While only the client device is intended to access the secret, malicious entities may attempt to access the client device (104) and obtain the secret without the permission of an intended user of the client device (104). Because of this possibility, the client device, rather than storing the secret as is, may store an encrypted version of the secret (also referred to as the encrypted secret (106A)). The encrypted secret (106A) may not be decrypted without the aid of at least one escrow agent system (100A, 100B). In this manner, the secret, in its decrypted form, may not be accessed by the malicious entity via access only to the client device (104).

In one or more embodiments of the invention, the authorization service (100) is a trusted entity that includes functionality for providing authentication to the escrow agent systems (100) as requested by the client device (104). The authorization service (102) may obtain authentication requests that specify credentials for the client device (104). The credentials may be verified by the authorization service (102), and confirmation of the validity of the credentials may be provided to the escrow agent systems (100). The validity may be used to determine whether an encryption or a decryption is initiated by the escrow agent systems (100) in accordance with the methods of FIGS. 2A and 2B. In this manner, a decryption of a secret stored in the client device (104) as initiated by a malicious entity may be prevented. While the system shown in FIG. 1 only includes a single authorization service, the system may be implemented using multiple authorization services without departing from the invention.

Figure 5:
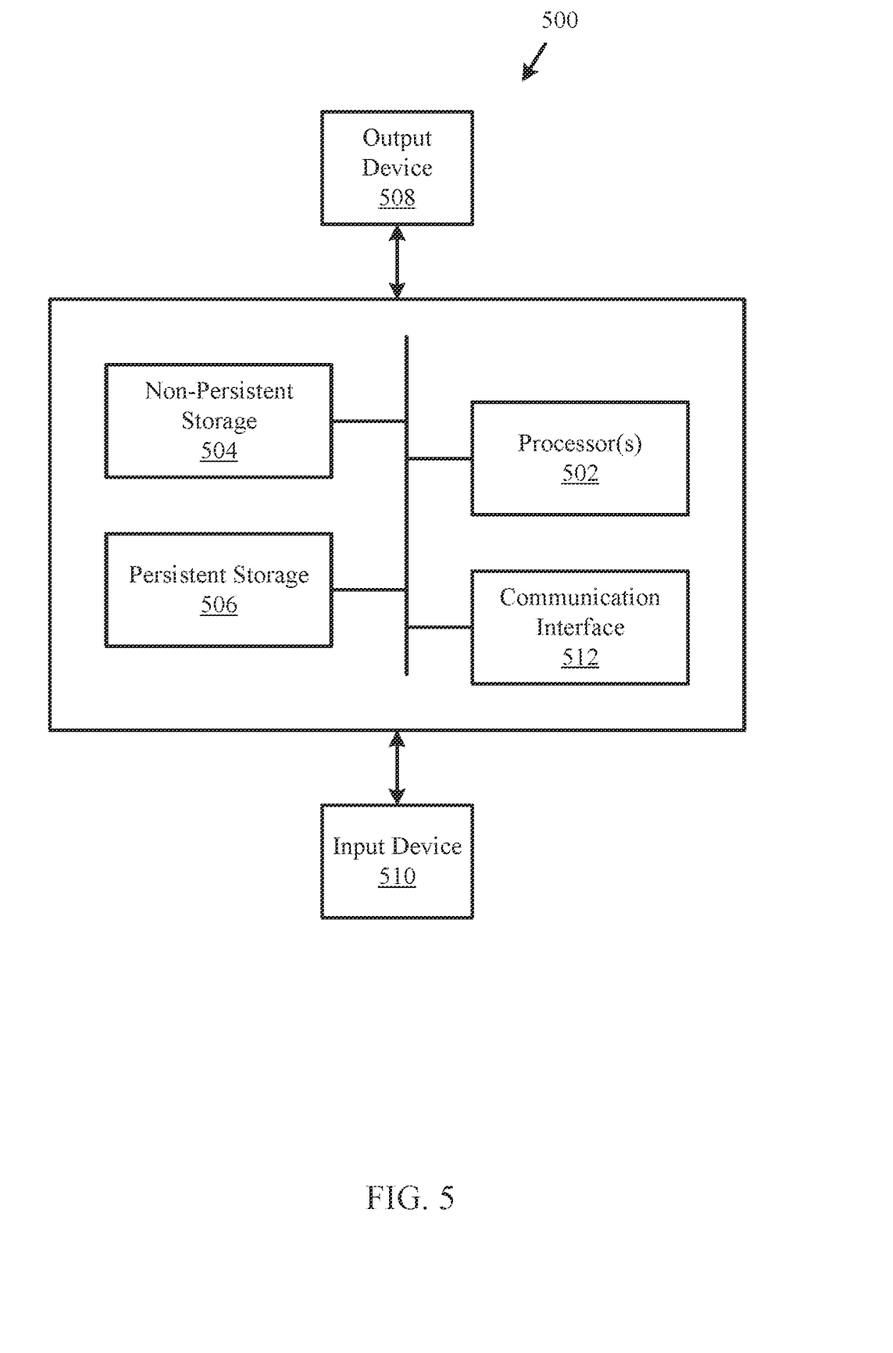
FIG. 5 shows a diagram of a computing device in accordance with one or more embodiments of the invention.

In one or more embodiments of the invention, the authorization service (102) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the authorization service (102) described throughout this application.

The authorization service (102) may be implemented as a logical device without departing from the invention. The logical device utilizes computing resources of any number of physical computing devices to provide the functionality of the authorization service (102) described throughout this application.

In one or more embodiments of the invention, the escrow agent systems (100) aid in the encryption and/or decryption of secrets as initiated by the client device (104). The escrow agent systems (100) may aid in the encryption of such secrets by generating pairing entries (further discussed in FIG. 2) that specify the process(es) for encrypting and/or decrypting secrets for a client device (104). Further, the escrow agent systems (100) may aid in the decryption of such secrets by implementing the pairing entries using obtained information from the client device (104). The escrow agents may perform the aforementioned aiding by performing the methods discussed in FIGS. 3A and 3C.

In one or more embodiments of the invention, each escrow agent system (100A, 100B) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the escrow agent system (100A, 100B) to perform the functionality of the escrow agent system (100A, 100B) described throughout this application and/or all, or a portion thereof, of the method illustrated in FIGS. 2B-2C.

Each escrow agent system (100A, 100B) may be implemented as a logical device without departing from the invention. The logical device utilizes computing resources of any number of physical computing devices to provide the functionality of the escrow agent system (100A, 100B) described throughout this application and/or all, or a portion thereof, of the method illustrated in FIGS. 2B-2C.

In one or more embodiments of the invention, the client device (104) utilizes the services of at least a portion of the escrow agent systems (100) to initiate encryption and storage of an encrypted secret (106A). The encrypted secret may be stored in a client device storage (106). The client device (104), operated by a client (e.g., a user), may send secret encryption initiation requests to a set of the escrow agent systems (100) to initiate encryption of the secret in accordance with FIG. 3A. Further, to perform the decryption, the client device (104) may utilize at least a portion of the aforementioned set of escrow agent systems (100) in accordance with FIG. 3C.

In one or more embodiments of the invention, the encrypted secret (106A) may be an encrypted version of a secret generated by the client device (106) and intended to not be shared with any device outside of the client device (104) or the client device storage (106). The encrypted secret (106A) may be generated in accordance with FIG. 3A.

In one or more embodiments of the invention, the client device (104) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device (104) described throughout this application and/or all, or a portion thereof, of the method illustrated in FIG. 2A.

The client device (104) may be implemented as a logical device without departing from the invention. The logical device utilizes computing resources of any number of physical computing devices to provide the functionality of the client device (104) described throughout this application and/or all, or a portion thereof, of the method illustrated in FIG. 2A.

While illustrated as a separate component from the client device (104), the client device storage (106) may be a component internal to the client device (104) without departing from the invention.

While the system of FIG. 1 only illustrates one client device (104) with one encrypted secret (106A), multiple client devices may utilize the services of the escrow agent systems (100) without departing from the invention. In such embodiments in which the escrow agent systems (100) service multiple client devices, each client device may utilize a separate client device storage corresponding to the client device and not intended to be accessed by other entities in the system.

Figure 2:
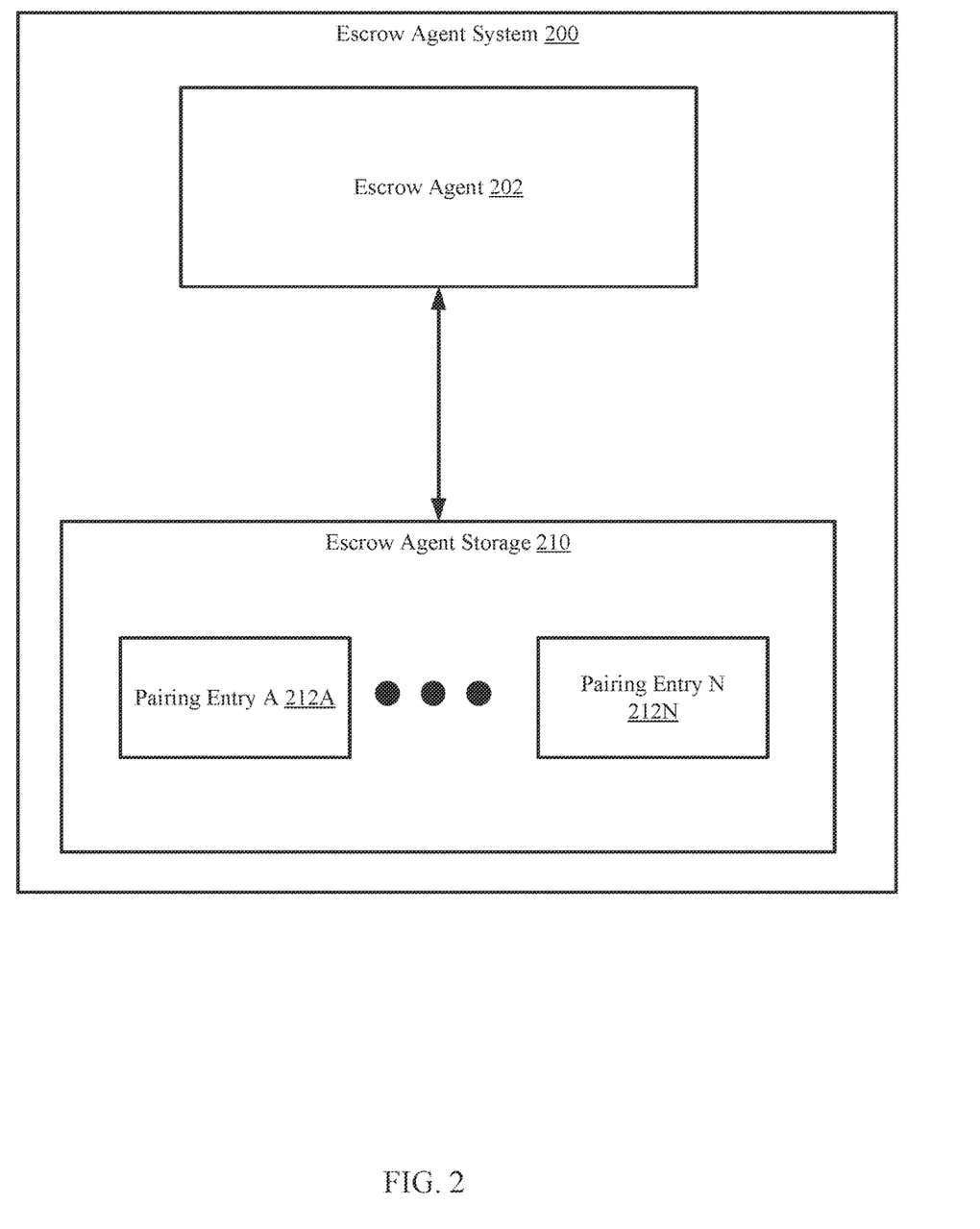
FIG. 2 shows a diagram of an escrow agent system in accordance with one or more embodiments of the invention.

FIG. 2 shows a diagram of an escrow agent system in accordance with one or more embodiments of the invention. The escrow agent system (200) may be an embodiment of an escrow agent system (100A, 100B) discussed above. As discussed above, the escrow agent system (200) includes functionality for aiding in the encryption and/or decryption of secrets as initiated by client devices. To perform the aforementioned functionality, the escrow agent system (200) includes an escrow agent (202) and an escrow agent storage (210). The escrow agent system (200) may include additional, fewer, and/or different components without departing from the invention.

In one or more embodiments of the invention, the escrow agent (202) aids in the encryption and/or decryption of at least portion of secrets initiated by the client devices. The escrow agent (202) may perform the methods of FIGS. 3B and 3D to aid in the encryption and/or decryption of the secrets (or portions thereof).

In one or more embodiments of the invention, the escrow agent storage (210) is a storage device operatively connected to the escrow agent (202) that is not intended to be accessible by the client devices or by other escrow agents. The escrow agent storage (210) may store pairing entries (212A, 212N). In one or more embodiments of the invention, each pairing entry (212A, 212N) is a data structure associated with a client. The pairing entry may specify the client (e.g., via a client identifier), the encryption algorithm performed on the corresponding secret, and a private key to be used for decrypting the corresponding secret. The client identifier may be a combination of number, letters, and/or symbols that uniquely identify the client.

FIGS. 3A-3D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3D may be performed in parallel with any other steps shown in FIGS. 3A-3D without departing from the scope of the invention.

Figure 3A:
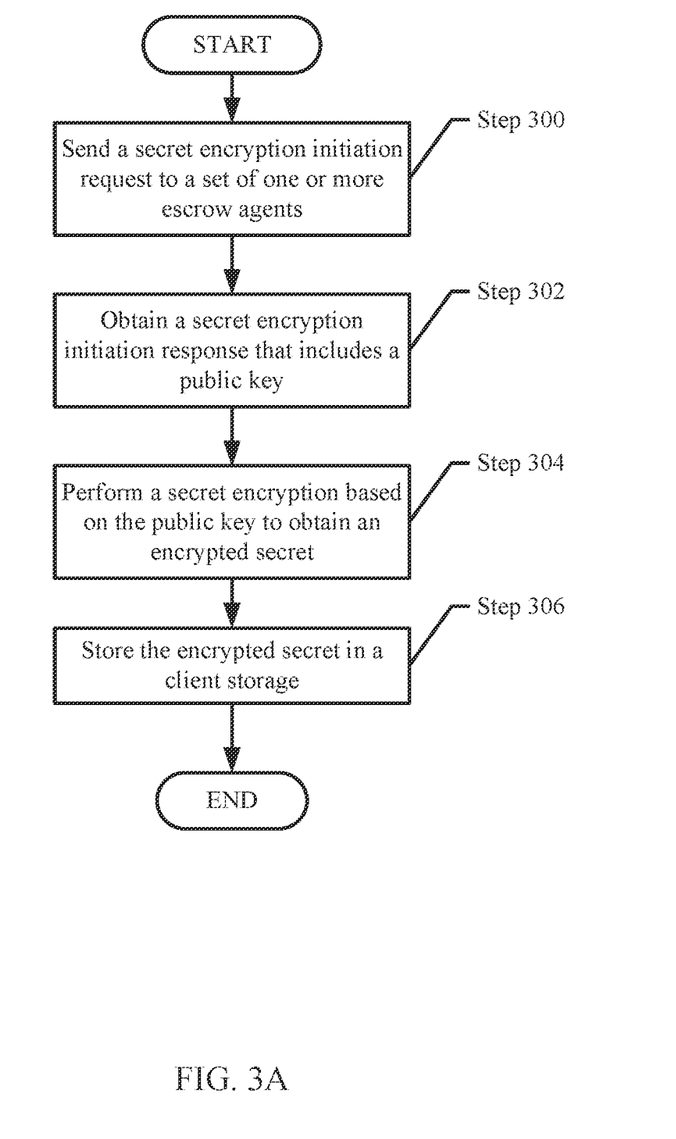
FIG. 3A shows a flowchart for initiating an encryption and storage of a secret in accordance with one or more embodiments of the invention.
Figure 3B:
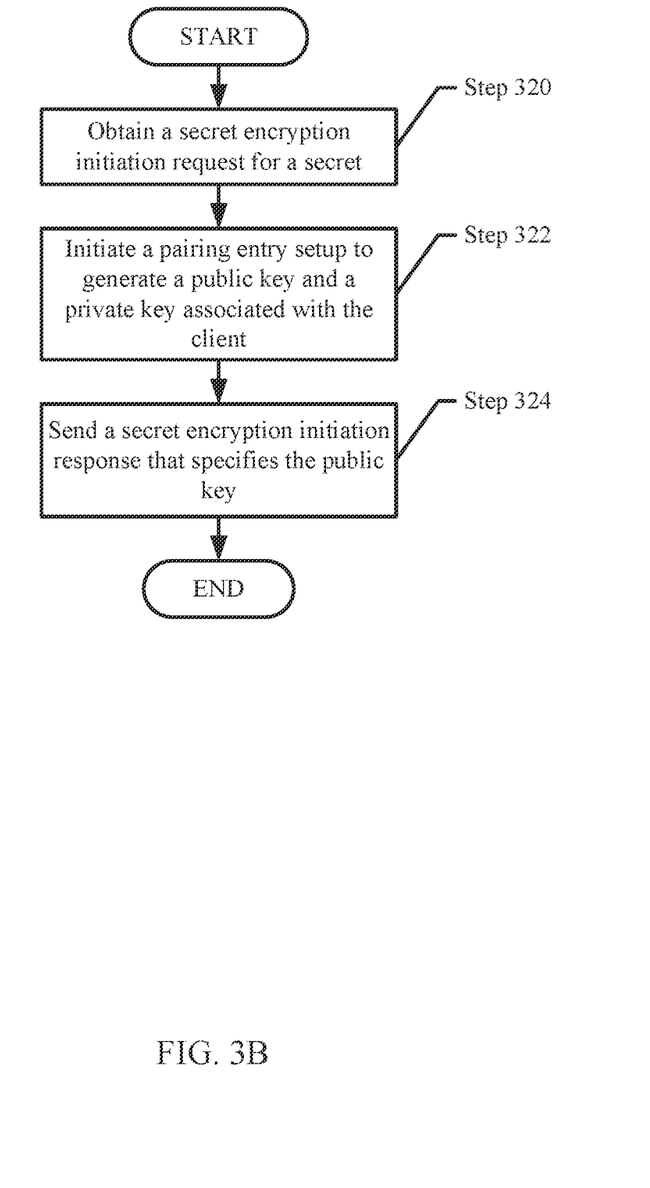
FIG. 3B shows a flowchart for servicing secret encryption initiation requests in accordance with one or more embodiments of the invention.

In one or more embodiments of the invention, prior to performing the methods of FIG. 3A-3B, an enrollment process is initiated. In one or more embodiments of the invention, the enrollment process includes sending, by a client device, an enrollment request to a set of one or more escrow agents. The enrollment request may specify initiating an enrollment of the services provided by the escrow agent. The enrollment request may include credential information used by the escrow agent(s) to verify the identity of the user associated with the client. The credential information may be further provided by the authorization service. In this manner, the services of the escrow agents may be utilized for one or more secrets (e.g., as discussed in FIGS. 3A-3D).

In response to the enrollment request, each of the escrow agents in the set of escrow agents may send an enrollment response. The enrollment response may include a public key to be used by the client device (or a client operating the client device) when encrypting secrets.

FIG. 3A shows a flowchart for initiating an encryption and storage of a secret in accordance with one or more embodiments of the invention. The method shown in FIG. 3A may be performed by, for example, a client device (104, FIG. 1). Other components of the system illustrated in FIG. 1 may perform the method of FIG. 3A without departing from the invention.

Turning to FIG. 3A, in step 300, a secret encryption initiation request is sent to a set of one or more escrow agents. In one or more embodiments of the invention, the secret encryption initiation request specifies initiating an encryption for a secret associated with the client operating the client device.

In such embodiments in which the set includes multiple escrow agents, and the secret encryption initiation request is sent to each of the multiple escrow agents in the set, each escrow agent may be assigned a portion of the secret such that the secret encryption initiation response is associated with the corresponding portion of the secret. Further, collectively, all of the portions assigned to the multiple escrow agents correspond to the whole secret.

In step 302, a secret encryption initiation response is obtained that includes a public key. In one or more embodiments of the invention, the secret encryption initiation response is obtained from each escrow agent in the set of escrow agents discussed above. In such embodiments in which the set of escrow agents is two or more, each public key may correspond to a portion of the secret. Further, the secret encryption initiation response may further specify the encryption algorithm to be performed on the secret (or corresponding portion of the secret). Examples of encryption algorithms include, but are not limited to: at a encryption standard (DES), Triple DES, Rivest-Shamir-Adleman (RSA), Blowfish, and Advanced Encryption Standard (AES).

In one or more embodiments of the invention, steps 300 and 302 are performed in conjunction with the enrollment request. In other words, the secret encryption initiation request may be performed only once per client. Specifically, in such embodiments, only steps 304-306 of FIG. 3A-3B is performed for a secret.

In step 304, a secret encryption based on the public key is performed to obtain an encrypted secret. The public key may be the public key obtained from either the secret encryption initiation response or from the enrollment response. In one or more embodiments of the invention, the secret encryption is performed by implementing the specified encryption algorithm, or a previously agreed-upon encryption algorithm, on the secret (or corresponding portions) using the obtained public key(s).

In step 306, the encrypted secret is stored in a client storage.

FIG. 3B shows a flowchart for servicing secret encryption initiation requests in accordance with one or more embodiments of the invention. The method shown in FIG. 3B may be performed by, for example, an escrow agent system (100A, 100B, FIG. 1). Other components of the system illustrated in FIG. 1 may perform the method of FIG. 3B without departing from the invention.

In step 320, a secret encryption initiation request is obtained for a secret (or a corresponding portion thereof). In one or more embodiments of the invention, the secret encryption initiation request is that of step 300 of FIG. 3A sent by the client device.

In step 322, a pairing entry setup is initiated to generate a public key and a private key associated with the client operating the client device. In one or more embodiments of the invention, the pairing entry is set up by generating a public key and a private key using a predetermined encryption algorithm. For example, the public key and the private key may be generated using a client identifier (e.g., using a hash function performed on the client identifier)

In one or more embodiments of the invention, the public key and private key may be unique to the client. The pairing entry may include the private key and the client identifier. Alternatively, the pairing entry may include information used by the escrow agent for generating the private key. For example, the pairing entry may include instructions for generating the private key by performing a hash function on the client identifier). The pairing entry may be stored in the escrow agent storage.

In step 324, a secret encryption initiation response that specifies the public key is sent to the client device. In one or more embodiments of the invention, the secret encryption initiation response may further include the encryption algorithm to be implemented on the secret (or corresponding portion thereof) as discussed in step 302 of FIG. 3B.

Figure 3C:
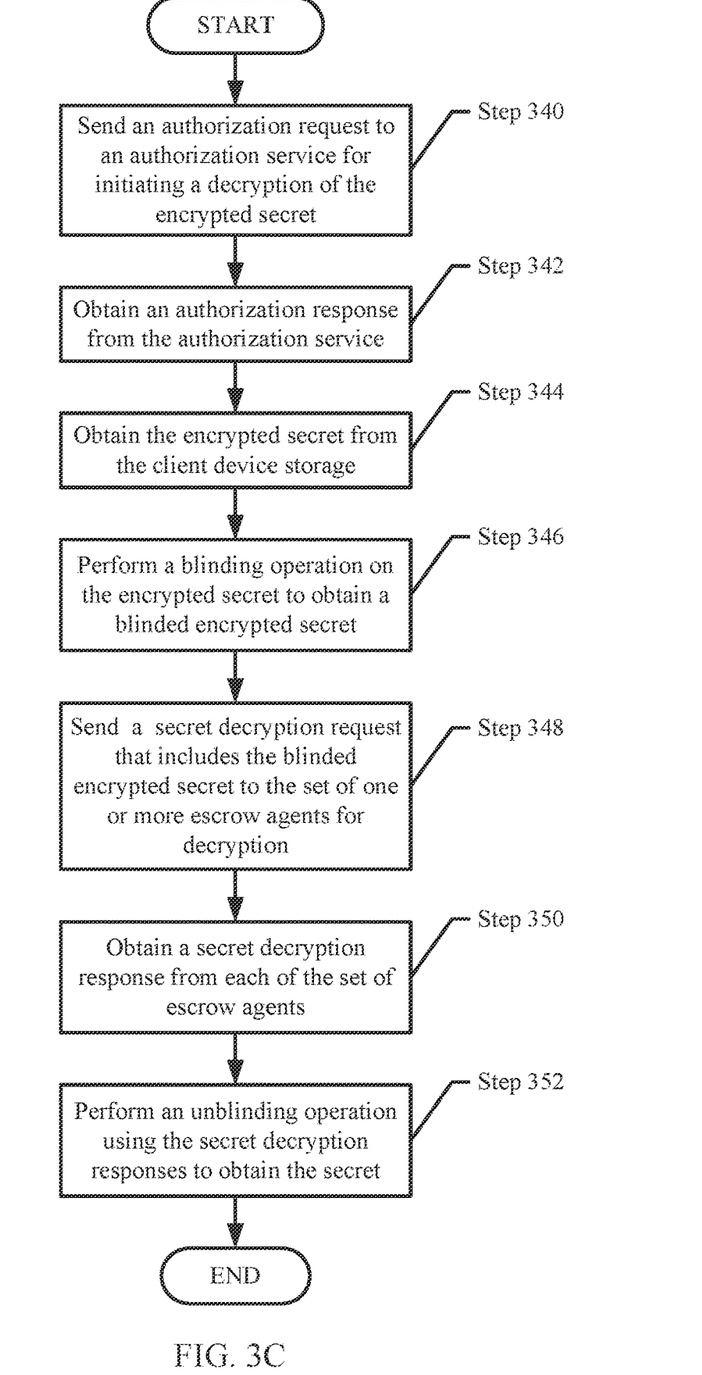
FIG. 3C shows a flowchart for initiating a decryption of a stored secret in accordance with one or more embodiments of the invention.

FIG. 3C shows a flowchart for initiating a decryption of a stored secret in accordance with one or more embodiments of the invention. The method shown in FIG. 3C may be performed by, for example, the client device (104, FIG. 1). Other components of the system illustrated in FIG. 1 may perform the method of FIG. 3C without departing from the invention.

In step 340, an authorization request is sent to an authorization service for initiating a decryption of the encrypted secret. In one or more embodiments of the invention, the authorization request specifies the credential information of a user of the client. The credential information may be information intended to be known only to the user. The credential information may be used to verify the identity of the user prior to attempting to decrypt the stored encrypted secret.

In step 342, an authorization response is obtained from the authorization service. In one or more embodiments of the invention, the authorization response may specify whether the authorization service has confirmed the identity of the user, and whether the escrow agent(s) have received such confirmation.

Steps 344-352 may be performed only if the authorization service confirms the identity of the user. In such embodiments in which the identity is not confirmed using the credential information, a notification may be sent to the client device that specifies the failed confirmation of the identity of the user. The user may then perform remediation actions to attempt to confirm its identity. For example, the user may resend correct credential information, update the credential information, contact the authentication service to perform secondary authentication (e.g., using two-factor authentication). Other remediation actions may be performed to attempt to confirm the identity of the user.

In step 344, the encrypted secret is obtained from the client device storage.

In step 346, a blinding operation is performed on the encrypted secret to obtain a blinded encrypted secret. In one or more embodiments of the invention, a blinding operation is a process for altering the encrypted secret such that: (i) the encrypted secret may be still decrypted by the escrow agent, (ii) the blinding operation may be undone using an inverse operation after the secret has been decrypted, and (iii) the blinding operation may not be undone without blinding values used during the blinding operation. The blinding values are intended to be known only to the client. In this manner, only the client may undo the blinding operation (e.g., using an unblinding operation discussed below).

In one or more embodiments of the invention, the blinding operation may be any combination of mathematical operators performed on the encrypted secret using the blinding values such that, after the encrypted secret is decrypted, an inverse of the combination of mathematical operators may be performed on the decrypted secret using the blinding values to obtain the secret.

In step 348, a secret decryption request is sent to at least a subset of the escrow agents for decryption. The secret decryption request may include the blinded encrypted secret (or a portion thereof).

In one or more embodiments of the invention, the subset of the escrow agents is a portion of the set of escrow agents to which the secret encryption initiation requests were sent in step 300 of FIG. 3A. In such embodiments in which multiple escrow agents are included in the set, and where each of the multiple escrow agents correspond to a portion of the secret, the subset is a minimum number of escrow agents required to perform the decryption of a first fraction of the secret such that the remaining fraction of the secret may be calculated (or otherwise generated) using the first fraction.

In one or more embodiments of the invention, the process of calculating the secret using a first fraction of the secret may be implemented using, at least in part, a Shamir's secret sharing scheme. In one or more embodiments of the invention, the Shamir's secret sharing scheme includes dividing the secret into a first number of portions, distributing each portion to an entity (e.g., an escrow agent) in a set of entities, where a predetermined second number of portions is sufficient to reconstruct the secret, where the second number is smaller than (or equal to) the first number. Other processes may be implemented to perform the calculation of the secret using a first fraction of the secret without departing from the invention.

In such embodiments in which the original set of escrow agents only includes one escrow agent, the one escrow agent may be included in the subset of escrow agent. Said another way, the entire blinded encrypted secret may be included in the secret decryption request sent to the one escrow agent.

In step 350, a secret decryption response is obtained from each of the subset of escrow agents. In one or more embodiments of the invention, the secret decryption response includes a blinded decrypted secret (or portion thereof). The blinded decrypted secret (or portion thereof) may be generated in accordance with FIG. 3D.

In step 352, an unblinding operation is performed using the secret decryption response(s) to obtain the secret. In one or more embodiments of the invention, the unblinding operation may include performing a version of an inverse of the blinding operation that undoes the blinding performed on the encrypted secret prior to decryption. In this manner, the client device obtains a decrypted, unblinded secret. In such embodiment in which only a first fraction of the secret is obtained from the escrow agents, a reconstruction may be performed on the fraction of the secret to obtain the complete secret.

Figure 3D:
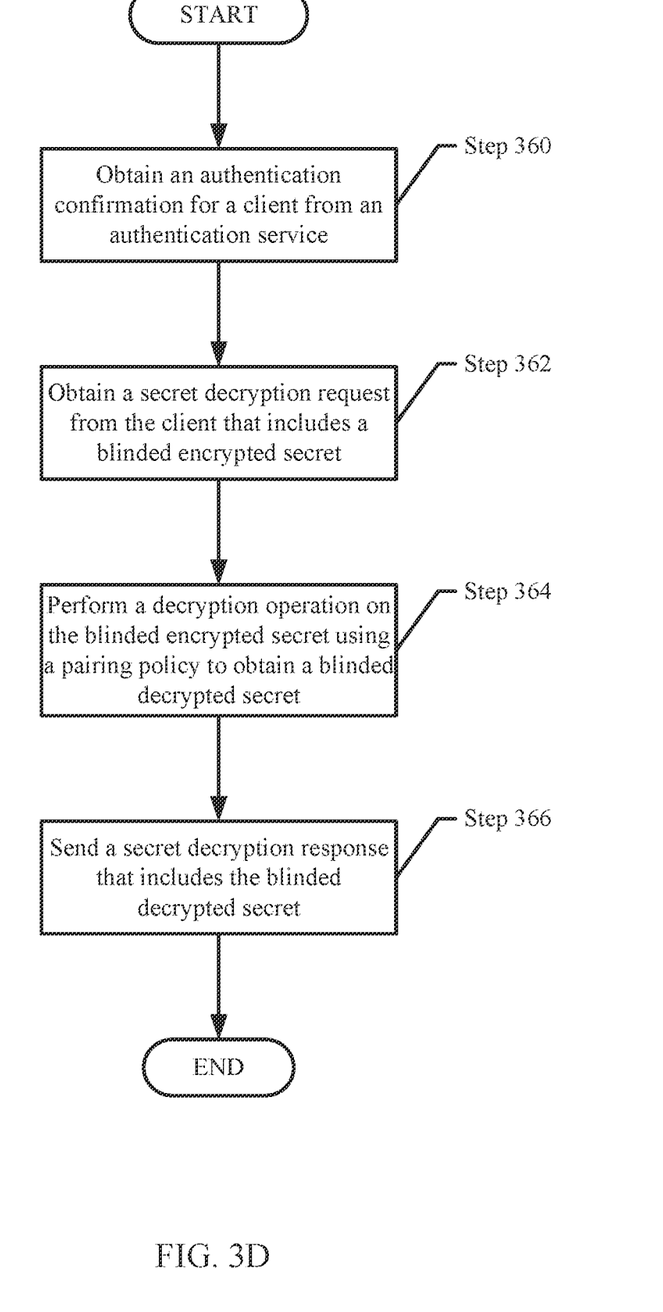
FIG. 3D shows a flowchart for servicing secret decryption requests in accordance with one or more embodiments of the invention.

FIG. 3D shows a flowchart for servicing secret decryption requests in accordance with one or more embodiments of the invention. The method shown in FIG. 3D may be performed by, for example, an escrow agent system (100A, 100B, FIG. 1). Other components of the system illustrated in FIG. 1 may perform the method of FIG. 3D without departing from the invention.

In step 360, an authorization confirmation for a client is obtained from an authentication service. In one or more embodiments of the invention, the authorization confirmation specifies that the identity of the client operating using the client device requesting to perform the secret decryption is verified and confirmed.

In step 362, a secret decryption request is obtained from the client that includes a blinded encrypted secret. In one or more embodiments of the invention, the secret decryption request is the secret decryption request discussed in step 348 of FIG. 3C.

In step 364, a decryption operation is performed on the blinded encrypted secret (or corresponding portion thereof) using the pairing entry generated in FIG. 3A. In one or more embodiments of the invention, the obtained blinded decrypted secret (or corresponding portion thereof) is generated by obtaining the pairing entry associated with the obtained secret and performing a decryption on the blinded encrypted secret using the private key associated with the pairing entry.

In step 366, a secret decryption response is sent. The secret decryption response may include the blinded decrypted secret as generated in step 364.

While the steps of FIGS. 3A-3D describe methods for performing blinding and/or unblinding operations on encrypted or decrypted versions of the secret (or portions thereof) by sending such versions of the secret (or portions thereof) to and from the escrow agents, embodiments of the invention may include performing blinding and/or unblinding operations on keys (e.g., the public and/or private keys discussed above), and using such versions of the public and/or private keys to perform the encryption, decryption, blinding, and/or unblinding operations on the secret by the client device. Said another way, in one or more embodiments, the blinding and/or unblinding operations may be performed on the public keys rather than the secret, and rather than transmitting blinded, encrypted secrets between the client devices and the escrow agents, the blinded encrypted keys are transmitted such that an escrow agent may not directly decrypt the secret using the blinded encrypted key should the escrow agent, acting maliciously, gain access to the encrypted secret.

In such embodiments, the client device (e.g., 104, FIG. 1) sends encryption requests to each of the set of escrow agents (e.g., 100A, 100B, FIG. 1). The encryption requests may include a set of encryption values to be used by the escrow agents to prepare a public key-private key pair for the client. The private key may be stored by the escrow agent and the public key may be provided to the client device. The public key, obtained by the client device, may be combined with additional unshared values to generate an encryption key. The encryption key may be used to encrypt the secret by the client device, and the encrypted secret may be stored in the client device storage. The client device may further store the encrypted secret and enough information (e.g., an additional key) to recreate the encryption key with the aid of the escrow agent. The encryption key may be deleted or otherwise removed from the client device's access. If the client device is using a set of multiple escrow agents, each escrow agent may be associated with the same or different encryption keys without departing from the invention.

During decryption, the client device may first validate the identity of the client using the authorization service (e.g., 102, FIG. 1), perform a blinding operation on each additional key using a blinding value unknown to the escrow agent, sends the blinded encryption key to the escrow agent. The escrow agent may perform a blinded decryption on the additional key to obtain a blinded decryption key and send the blinded decryption key to the client device. The client device may perform an unblinding operation on the blinded decryption key to generate a decryption key to be used to decrypt the encrypted secret by the client device.

In one or more embodiments of the invention, the blinding operation and encryption discussed above is performed in conjunction, at least in part, using a Diffie-Hellman encryption algorithm. The following is a non-limiting example of the Diffie-Hellman encryption algorithm performed on a secret S during encryption.

Consider a scenario in which a client device (C) is performing a blinding operation in conjunction with an Escrow Agent (EA).

Step 1: C and EA agree on a publicly accessible prime modulus p and base g.

Step 2. EA chooses a private number (B_C) which corresponds to C but is not accessible by C. (B_C) is stored in the escrow agent storage.

Step 3. EA computes $g^{(B\_C)}$ mod p and sends it to C.

Step 4. C chooses a private random number A which will be discarded after step 5.

Step 5. C computes $g^{A(B\_C)}$ mod p and hashes it to generate an encryption key. In one embodiment of the invention, hashing is only necessary to ensure the encryption key will conform to encryption standards and, as such, may not be used in all implementations of the invention.

Step 6. C performs an encryption on the secret S using the hash of $g^{A(B\_C)}$ mod p as a key to generate the encrypted secret $S_{enc}$, and stores the blinded encrypted secret $S_{enc}$ and the value $g^A$ mod p.

At a later point in time, C desires to decrypt the encrypted secret $S_{enc}$. The following is a non-limiting example of the Diffie-Hellman encryption algorithm performed on the encrypted secret $S_{enc}$ during decryption.

Step 7: C chooses a random number z.

Step 8: C retrieves $g^A$ mod p and computes $g^{Az}$ mod p.

Step 9: C sends $g^{Az}$ mod p to EA.

Step 10: EA retrieves or recomputes (B_C) and computes $g^{Az(B\_C)}$ mod p.

Step 11: EA sends $g^{Az(B\_C)}$ mod p to C.

Step 12: C calculates z' such that $g^{zz'}=1$ mod p and raises $g^{Az(B\_C)}$ by z' to obtain $g^{A(B\_C)}$ mod p.

Step 13: C can now hash $g^{A(B\_C)}$ mod p, and use the output of the hash as the key to perform a decryption operation on $S_{enc}$ to obtain S.

Example

Figure 4A:
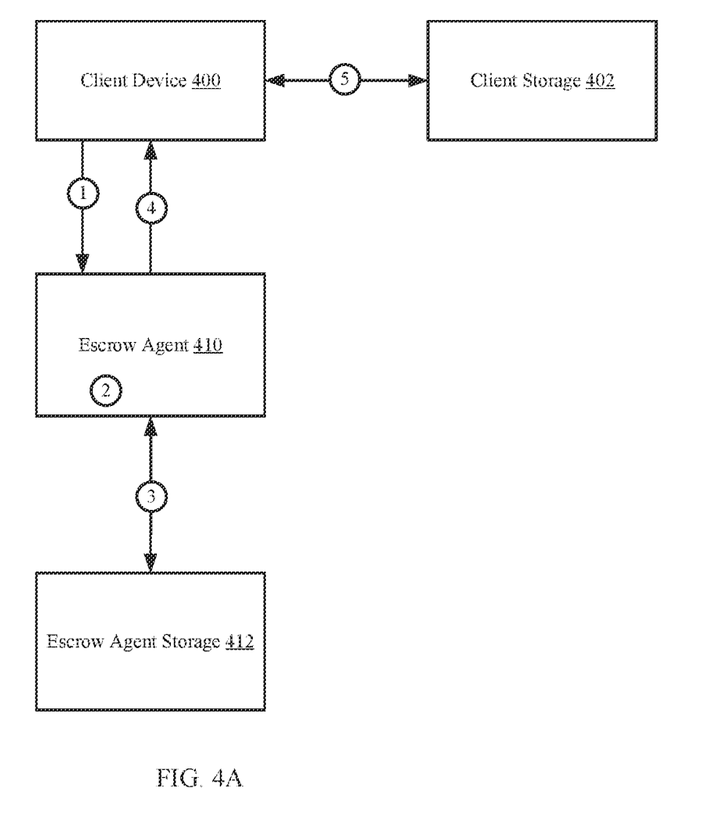
FIGS. 4A-4B show an example in accordance with one or more embodiments of the invention.
Figure 4B:
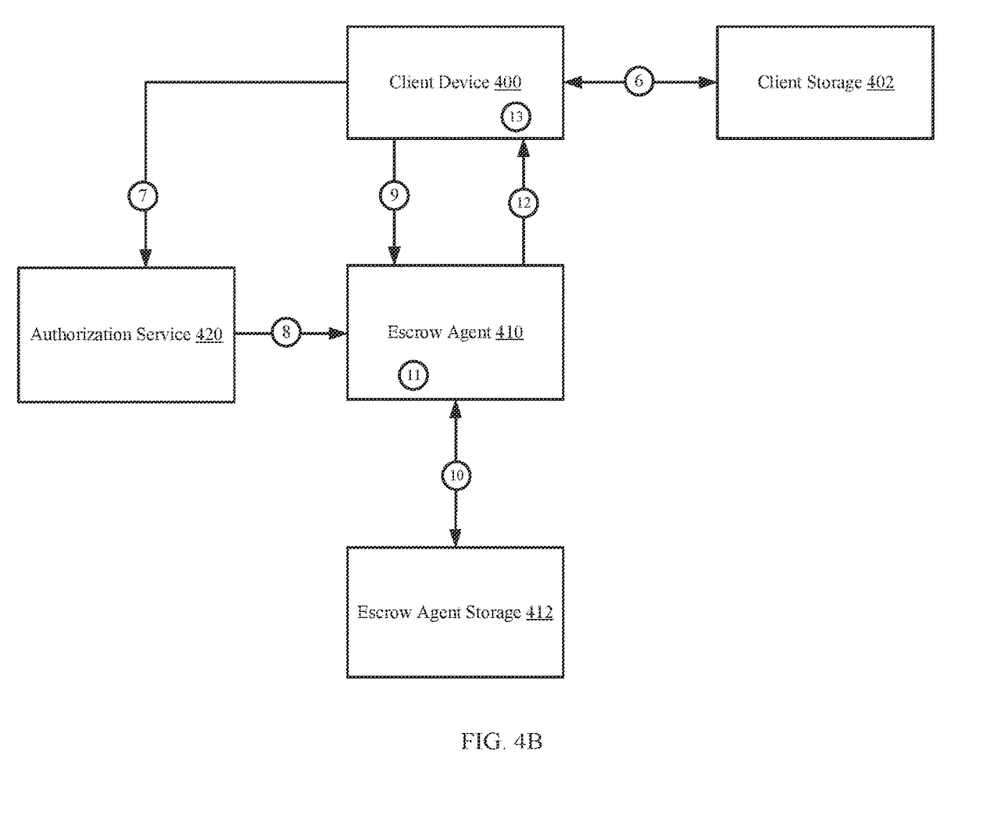

The following section describes an example. The example, illustrated in FIGS. 4A-4B, is not intended to limit the invention. Actions performed by components of the illustrated system are illustrated by numbered, circular boxes interconnected, in part, using arrows, and described in this application using numbered brackets.

Turning to the example, consider a scenario in which a client device would like to store an encrypted secret to prevent a malicious entity from accessing the secret should the malicious entity gain access to the client device.

FIG. 4A shows a diagram of an example system in accordance with one or more embodiments of the invention. The example system includes a client device (400), a client storage (402), an escrow agent (410), and an escrow agent storage (412). For the sake of brevity, not all components of the example system are illustrated in FIG. 4A.

The client device, after having generated the secret, sends a secret encryption initiation request to the escrow agent (410) that specifies providing a public key to the client device (400) [1].

The escrow agent (410) in response to the secret encryption initiation request, generates a public key and a private key using a random generation tool [2].

The private key is stored with a client identifier as a pairing entry in the escrow agent storage (412) [3]. Further, the public key is provided to the client device (400) [4] as a secret encryption initiation response.

The client device (400) encrypts the generated secret using the obtained public key. The encrypted secret is stored in the client storage (402) [5].

Referring to FIG. 4B, FIG. 4B shows a second diagram of the example system at a later point in time. FIG. 4B further illustrates an authorization service (420) used to validate any secret decryption requests. The client (400) obtains the encrypted secret from the client storage (402) [6]. The client then sends an authentication request to the authorization service (420) that specifies the credentials for the user of the client device (400) [7]. The authorization service (420), in response to the authorization request, analyzes the credentials and confirms the identity of the user. The authorization service (420) transmits an authorization response to the escrow agent (410) [8].

After the client device (400) has been authorized to initiate a secret decryption, the client device (400) initiates a blinding operation by combining (e.g., multiplying) the secret to by the blinding value, known only to the client device (400). The client device (400) provides the blinded encrypted value to the escrow agent (410) as a secret decryption request [9].

The escrow agent, in response to the secret decryption request, obtains the pairing entry from the escrow agent storage (412) to determine that the private key is required to service the secret decryption request [10]. The escrow agent uses the private key to decrypt the blinded encrypted secret, which generates a blinded decrypted key [11]. The blinded decrypted secret is provided to the client device (400).

The client device (400), in response to obtaining the blinded decrypted secret, performs the unblinding operation that includes performing an inverse of the blinding operation, which results in an unblinded, decrypted secret [13].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices in a distributed environment. More specifically, embodiments of the invention improve a system that protects the privacy of stored data in the event of a malicious attack.

In current implementations, there are mechanisms for performing encryption on data using public keys and private keys generated by the entity requesting to perform the encryption. Embodiments of the invention utilize escrow agent(s) that generate the public keys and private keys, which enable the querying device to perform the encryption without performing the decryption. By preventing the querying device (e.g., a client device) from being able to decrypt the stored data (e.g., a secret) without the aid of the escrow agent(s), malicious entities accessing the querying device are prevented from accessing the data.

Embodiments of the invention further utilize multiple escrow agents to perform the protection of one secret such that no one escrow agent may include functionality for decrypted an entire secret. This may prevent malicious entities attacking one of the escrow agents from accessing the secret. As an added level of protection, any secret (or portion thereof) obtained by an escrow agent may be further modified by a blinding operation that prevents the escrow agent from accessing the decrypted secret without the blinding values, which are not shared with the escrow agent by the querying device.

Embodiments of the invention implement the trustworthiness of the system by using a trusted entity (e.g., an authorization service) that confirms validity of a identity of a user associated with the secret operating the querying device. In this manner, a decryption of the secret is only performed if the identity of the user is confirmed by the authorization service.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A method for securing a secret of a client using an escrow agent operatively connected to the client, the method comprising:
   initiating enrollment of the client with the escrow agent, wherein the enrollment results the escrow agent generating a key pair comprising a public key and a private key;
   obtaining the public key from the escrow agent, wherein the private key is not shared with the client;
   encrypting the secret with the public key to obtain an encrypted secret, wherein encrypting the secret with the public key to obtain the encrypted secret comprises:
      dividing the secret into N portions, wherein N is greater than or equal to 2;
      encrypting a first portion of the N portions with the public key to obtain a first encrypted portion,
      encrypting a second portion of the N portions with a second public key associated with a second escrow agent to obtain a second encrypted portion;
      storing the first encrypted portion and the second encrypted portion on the client; and
   storing the encrypted secret on the client.

2. The method of claim 1, further comprising:
   after the storing:
      authenticating the client, upon successful authentication, sending the encrypted secret to the escrow agent for decryption, wherein the escrow agent is configured to decrypt the encrypted secret using the private key to obtain the secret; and
      receiving in response to the sending, the secret.

3. The method of claim 1, further comprising:
   after the storing:
      performing a blinding operation on the encrypted secret to obtain a blinded encrypted secret;
      sending the blinded encrypted secret to the escrow agent for decryption, wherein the escrow agent is configured to decrypt the blinded encrypted secret using the private key to obtain the blinded secret;
      receiving in response to the sending, the blinded secret; and
      performing an unblinding operation on the blinded secret to obtain the blinded secret, wherein the escrow agent does not have access to the secret.

4. The method of claim 3, wherein performing the blinding operation comprises using a blinding value, wherein the blinding value is only known to the client.

5. The method of claim 4, wherein performing the unblinding operation comprises using the blinding value.

6. The method of claim 1, further comprising:
   sending at least K encrypted portions to K escrow agents, wherein the escrow agent is one of the at least K escrow agents, wherein K is less than N;
   obtaining K portions from the K escrow agents; and
   generating the secret using the K portions.

7. A method for securing a secret of a client using an escrow agent operatively connected to the client, the method comprising:
   initiating enrollment of the client with the escrow agent, wherein the enrollment results the escrow agent and the client establishing a base value (g) and prime modulus value (p), and wherein the escrow agent generates a private number (B_C) that is associated with the client but is not accessible to the client;
   obtaining a public key from the escrow agent, wherein the public key is derived from g, p, and B_C;
   generating an encryption key using the public key and a private random number A, wherein A is not accessible to the escrow agent;
   encrypting the secret using the encryption key to obtain an encrypted secret; and
   storing the encrypted secret and an additional key in the client, wherein the additional key is a function of p, g, and A.

8. The method of claim 7, wherein A is deleted after the encryption key is generated.

9. The method of claim 7, further comprising:
   performing a blinding operation on the additional key to obtain a blinded additional key;
   sending the blinded additional key to the escrow agent, wherein the escrow agent is configured to generate a blinded encryption key using the blinded additional key and B_C; and
   receiving in response to the sending, the blinded encryption key; and
   performing an unblinding operation on the blinded encryption key to obtain the encryption key; and
   decrypting the encrypted secret using the encryption key to obtain the secret.

10. The method of claim 9, wherein performing the blinding operation comprises:
    obtaining a number z, wherein z is only known to the client; and
    generating the blinded additional key using z and the additional key.

11. The method of claim 10, wherein performing the unblinding operation comprises:
    determining a number z', wherein $g^{zz'}, =1 \mod p$;
    obtaining the decryption key using z' and the blinded decryption key.

12. The method of claim 7, wherein generating the encryption secret further comprises using a hash function.

13. A non-transitory computer readable medium comprising computer readable program code, which when executed by a computer processor enables the computer processor to perform a method for securing a secret of a client using an escrow agent operatively connected to the client, the method comprising:

initiating enrollment of the client with the escrow agent, wherein the enrollment results the escrow agent generating a key pair comprising a public key and a private key;
obtaining the public key from the escrow agent, wherein the private key is not shared with the client;
encrypting the secret with the public key to obtain an encrypted secret; and storing the encrypted secret on the client, wherein encrypting the secret with the public key to obtain the encrypted secret comprises:
dividing the secret into N portions, wherein N is greater than or equal to 2;
encrypting a first portion of the N portions with the public key to obtain a first encrypted portion,
encrypting a second portion of the N portions with a second public key associated with a second escrow agent to obtain a second encrypted portion; and
storing the first encrypted portion and the second encrypted portion on the client.

14. The non-transitory computer readable medium of claim 13, the method further comprising:
after the storing:
authenticating the client, upon successful authentication, sending the encrypted secret to the escrow agent for decryption, wherein the escrow agent is configured to decrypt the encrypted secret using the private key to obtain the secret; and
receiving in response to the sending, the secret.

15. The non-transitory computer readable medium of claim 13, the method further comprising:
after the storing:
performing a blinding operation on the encrypted secret to obtain a blinded encrypted secret;
sending the blinded encrypted secret to the escrow agent for decryption, wherein the escrow agent is configured to decrypt the blinded encrypted secret using the private key to obtain the blinded secret;
receiving in response to the sending, the blinded secret; and
performing an unblinding operation on the blinded secret to obtain the blinded secret, wherein the escrow agent does not have access to the secret.

16. The non-transitory computer readable medium of claim 13, wherein performing the blinding operation comprises using a blinding value, wherein the blinding value is only known to the client.

17. The non-transitory computer readable medium of claim 16, wherein performing the unblinding operation comprises using the blinding value.

18. The non-transitory computer readable medium of claim 13, the method further comprising:
sending at least K encrypted portions to K escrow agents, wherein the escrow agent is one of the at least K escrow agents, wherein K is less than N;
obtaining K portions from the K escrow agents; and
generating the secret using the K portions.

* * * * *